United States Patent [19]

Siegenthaler

[11] Patent Number: 5,312,237
[45] Date of Patent: May 17, 1994

[54] AUXILIARY SUPPORT FOR ROAD VEHICLE TIRES

[75] Inventor: Karl J. Siegenthaler, Rome, Italy

[73] Assignee: Bridgestone Corporation, Tokyo, Japan

[21] Appl. No.: 966,792

[22] Filed: Oct. 27, 1992

[30] Foreign Application Priority Data

Oct. 31, 1991 [IT] Italy .................... T091A 000824

[51] Int. Cl.5 ............................................ B29C 35/02
[52] U.S. Cl. ................................... 425/58; 425/58.1
[58] Field of Search .............. 425/28.1, 36, 44, 54, 425/55, 58, 58.1; 156/414

[56] References Cited

U.S. PATENT DOCUMENTS

| | | | |
|---|---|---|---|
| Re. 31,273 | 6/1983 | Peterson | 425/58 |
| 2,835,922 | 5/1958 | Fassero et al. | 425/58 |
| 2,979,091 | 4/1961 | Noall | 425/58.1 |
| 2,980,950 | 4/1961 | Smyser | 425/44 |
| 4,323,414 | 4/1982 | Severson | 156/414 |
| 4,529,367 | 7/1985 | Fike | 425/58 |
| 4,738,604 | 4/1988 | Fike et al. | 425/44 |

Primary Examiner—Khanh Nguyen
Assistant Examiner—James P. Mackey
Attorney, Agent, or Firm—David A. Thomas

[57] ABSTRACT

An auxiliary support (1) for a road vehicle tire (2), which support (1) is defined by a tubular drum (3) fitted in a fluidtight manner with the interior of a finished tire (2) for mutually locking the bead portions (22) of the tire (2) in a fixed position when the tire is pressurized, and constituting a carriage whereby the pressurized tire (2) is transferred along a post-inflation route (8) subsequent to curing.

5 Claims, 1 Drawing Sheet

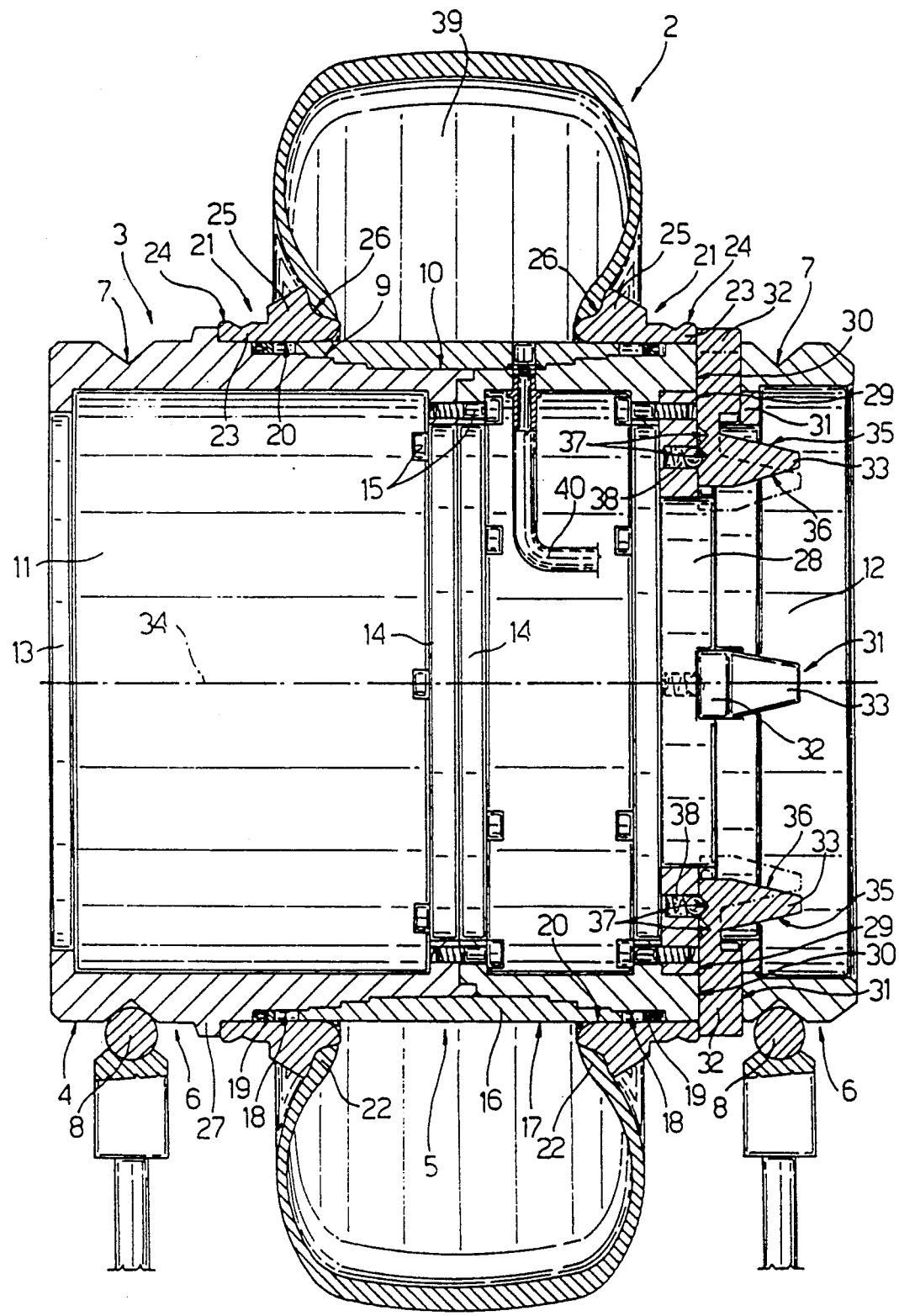

AUXILIARY SUPPORT FOR ROAD VEHICLE TIRES

BACKGROUND OF THE INVENTION

1. Technical Field

The present invention relates to an auxiliary support for road vehicle tires.

2. Background Information

A standard practice in the tire industry is to transfer the tire on a conveyor from the curing mold to a post-inflation station, where it is fitted in a fluidtight manner to a support, inflated and maintained at close to working pressure until it cools to substantially room temperature.

SUMMARY OF THE INVENTION

It is an object of the present invention to provide an auxiliary tire support which provides not only for trouble free, low-cost transfer of a pressurized tire from the curing mold to the post-inflation station, but also for preventing harmful distortion of the tire during transfer.

According to the present invention, there is provided an auxiliary support for a road vehicle tire, characterized by the fact that it comprises a drum having a substantially cylindrical outer surface; two annular elements fitted in sliding and fluidtight manner to said outer surface, which comprises an intermediate portion and two end portions; and first and second stop means for confining said annular elements within said intermediate portion of said outer surface; each annular element having an outer surface mating in a fluidtight manner with a respective bead portion of the tire; at least one of said stop means being releasable; and said end portions of said outer surface defining rolling surfaces for said drum.

BRIEF DESCRIPTION OF THE DRAWINGS

The present invention will be described with reference to the accompanying single sheet of drawing, which shows a schematic axial section of a preferred, nonlimiting embodiment.

BEST MODE FOR CARRYING OUT THE INVENTION

Number 1 in the accompanying drawing indicates an auxiliary support for a tire 2, which has just been removed from a curing mold (not shown).

Auxiliary support 1 comprises a drum 3 having a substantially cylindrical outer surface 4 consisting of a central portion 5, and two end portions 6 which define rolling surfaces for rolling drum 3 along a given route. In particular, each end portion 6 presents a circumferential groove 7 engaged by a respective rail 8 for rolling drum 3 along a route defined by rails 8.

Central portion 5 of surface 4 presents an annular recess 9 having a sunken central annular portion 10, along the center line of which drum 3 is divided transversely into two half-drums 11 and 12. On the opposite end to that facing half-drum 12, half-drum 11 presents a first inner flange 13, and on the other end, a second inner flange 14 screwed by screws 15 to a corresponding inner flange 14 on half-drum 12.

Sunken annular portion 10 is engaged by the intermediate portion of a ring 16 coaxial with drum 3. Ring 16 has an outer surface 17 of the same diameter as surface 4, and defines with end portions 6 of surface 4, two annular grooves 18, each engaged by an annular seal 19.

In connection with the above, it should be pointed out that recess 9, ring 16 and the division of drum 3 into half drums 11 and 12, provide solely for trouble free assembly of seals 19 inside respective grooves 18.

Each seal 19 cooperates in a fluidtight manner with cylindrical inner surface 20 of a respective annular element 21, the inside diameter of which is approximately equal to but no smaller than, the diameter of surface 4, and provides for supporting a respective bead portion 22 of tire 2.

As described in co-pending U.S. Pat. application Ser. Nos. 07/966,977 and 07/967,345 filed concurrently herewith to which full reference is made herein in the interest of full disclosure, said two annular elements 21 form part of a forming mold (not shown) and subsequently, of a curing mold for tire 2. Each annular element 21 comprises an annular plate 23 defined internally by surface 20. The outer cylindrical surface 24 of plate 23, on the side facing the other annular element 21, presents a substantially triangular-section annular rib 25. On the side facing the other annular element 21, rib 25 is defined by an annular surface 26 having a curved section. The concave side of the curved section faces the other annular element 21, and is shaped so as to mate with a respective bead portion 22 of tire 2.

End portion 6 of surface 4 of half-drum 11 is defined, towards half drum 12, by an annular rib 27 projecting radially outwards from surface 4 and outwardly adjacent to respective seal 19.

Half drum 12 is fitted inside with an annular body 28 through which are formed a number of radial openings 29, each aligned with a corresponding radial opening 30 through half-drum 12. Each pair of radial openings 29 and 30 is engaged in a sliding manner by a substantially L-shaped latch 31. Latch 31 comprises a rod 32 arranged radially in relation to half-drum 12 and fitted in a sliding manner through respective openings 29 and 30. An appendix 33 projects outwards from the inner end of rod 32 and is parallel to axis 34 of drum 3. Appendix 33 is substantially wedge-shaped, and is defined laterally by two surfaces 35 and 36 sloping in relation to each other and to axis 34.

Each rod 32 presents two lateral recesses 37 engaged by a spherical locking device 38, for selectively locking rod 32 in a withdrawn idle position. The end of rod 32 opposite that fitted with appendix 33, is located inside or at most, coplanar with surface 4. When in an extracted operating position, rod 32 projects outwards of surface 4. In the operating position, rods 32 define with annular rib 27, a compartment housing between annular elements 21, which in turn define, in use and together with supported tire 2 and ring 16, a fluidtight toroidal bladder 39 communicating with a compressed air supply conduit 40 fitted in a fluidtight manner through half-drum 12 and ring 16.

In actual use, latches 31 are first set to the withdrawn idle position, and tire 2, with bead portions 21 fitted to respective annular elements 21, is mounted onto drum 3, on the half-drum 12 side, so that one of the annular elements 21 contacts rib 27. At this point, latches 31 are set to the extracted operating position, to prevent the other annular element 21 from sliding out, and compressed air if fed into bladder 39 to inflate tire 2 to substantially working pressure.

The pressure inside tire 2 pushes annular elements 21 outwards against the stop elements consisting of rib 27 on one side and latches 31 on the other, and into a precise mutual position, which is maintained for as long as bladder 39 remains pressurized with latches 31 in the extracted operating position. This therefore provides for maintaining a precise configuration of tire 2, pending completion of the post-inflation stage, preventing serious distortion of the finished tire.

The exposed end portions of drum 3 projecting on either side of tire 2 may readily be employed as rolling surfaces for transferring drum 3 together with tire 2 to and from the post-inflation station.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. An auxiliary support for a road vehicle tire comprising a drum having a substantially cylindrical outer surface; two annular elements fitted in a sliding and fluidtight manner to said outer surface, said outer surface comprising an intermediate portion and two end portions; first and second stop means for confining said annular elements within said intermediate portion of said outer surface; each annular element having an outer surface mating in a fluidtight manner with a respective bead portion of a tire; at least one of said stop means being releasable from one of said annular elements; and said end portions of said outer surface defining rolling surfaces for said drum.

2. An auxiliary support as claimed in claim 1, in which each of said end portions presents a circumferential groove; in which rail means is provided for defining a rolling route of said drum; and in which each of said grooves is engaged by said rail means for rolling said drum along said route.

3. An auxiliary support as claimed in claim 1, in which said releasable stop means comprise a plurality of latches fitted through said drum and designed to move to and from an extracted operating position wherein they project outwards of said outer surface of said drum.

4. An auxiliary support as claimed in claim 1 including two seals, each fitted about said drum and cooperating, in use, in a fluidtight manner with an inner surface of a respective one of said annular elements.

5. An auxiliary support as claimed in claim 1 including pressurized fluid supply means fitted through said drum between said stop means.

* * * * *